United States Patent
Remillard (12)

(10) Patent No.: US 6,324,823 B1
(45) Date of Patent: Dec. 4, 2001

(54) MOUNTING A FINGER ON THE BAT OF A HARVESTING HEADER

(75) Inventor: Rheal G. Remillard, Manitoba (CA)

(73) Assignee: MacDon Industries Ltd., Manitoba (CA)

( * ) Notice: Subject to any disclaimer, the term of this patent is extended or adjusted under 35 U.S.C. 154(b) by 0 days.

(21) Appl. No.: 09/407,867

(22) Filed: Sep. 29, 1999

(51) Int. Cl.⁷ ................................................. A01D 57/02
(52) U.S. Cl. ................................................. 56/220; 56/400
(58) Field of Search ........................... 56/167, 168, 219, 56/220, 400, 400.21, DIG. 21, DIG. 20; 460/121, 122

(56) References Cited

U.S. PATENT DOCUMENTS

| | | | |
|---|---|---|---|
| 2,909,889 | * 10/1959 | Gustafson | 56/400 |
| 3,066,470 | * 12/1962 | Johnston | 56/400 |
| 3,157,019 | * 11/1964 | Brackbill | 56/400 |
| 3,613,346 | * 10/1971 | Hubbard | 56/400 |
| 3,796,030 | * 3/1974 | Neal et al. | 56/220 |
| 4,520,620 | * 6/1985 | Gessel et al. | 56/400 |
| 4,706,448 | * 11/1987 | Gessel et al. | 56/400 |
| 4,776,155 | 10/1988 | Fox et al. . | |
| 4,901,511 | * 2/1990 | Yarmashev et al. | 56/220 |

* cited by examiner

*Primary Examiner*—Thomas B. Will
*Assistant Examiner*—Meredith Petravick
(74) *Attorney, Agent, or Firm*—Adrian D. Battison

(57) ABSTRACT

A crop harvesting header includes a reel mounted on a pair of forwardly extending arms carried on a header frame above a table and cutting knife. The reel is rotatable about a longitudinal axis and includes bats with fingers which pivot each about a respective bat axis so the angle of the fingers varies as the reel rotates. The bat includes a longitudinal tube which supports the fingers at spaced positions along its length. At each finger location the tube is punched to define two diametrically opposed indentations each forming a hole through the tube wall. Each finger has a finger portion of I shape in cross-section and a mounting collar. The collar only partly surrounds the tube so as to have a portion which can flex open to allow the collar to be wrapped around the tube. Two projections are provided on the inside surface of the collar to project into a respective one of the indentations. A bolt passes through holes in the projections aligned with the holes in the indentations to clamp the projections into the indentations.

19 Claims, 4 Drawing Sheets

MOUNTING A FINGER ON THE BAT OF A HARVESTING HEADER

This invention relates to a crop harvesting header of the type including a pickup reel and particularly to an arrangement for mounting a finger on the support tube of a bat of the reel.

BACKGROUND OF THE INVENTION

The conventional harvesting header comprises a frame for mounting on a crop harvesting machine for movement across ground carrying a crop to be harvested, the frame defining a working width of the header, a table mounted on the frame across the width of the header for receiving the crop when cut for transportation along the header, a cutting knife along a front edge of the table for cutting the crop and a pickup reel mounted above the knife and the table for controlling the crop as it moves onto the table. The reel comprises a main elongate support beam and a plurality of bats at angularly spaced positions around the main beam.

A reel of this type is shown in U.S. Pat. No. 4,776,155 assigned to the present assignee. The bat comprises a tube formed from shaped sheet metal and defining a cylindrical section along one edge of the tube so that the cylindrical section can be connected end to end to other such bats by short connecting pipe sections. The pipe sections and the cylindrical section thus define an axis around which the bat rotates. Each finger is inserted into a pocket defined in the sheet metal tube so as to project outwardly in a radial plane of the axis. Each finger is formed from a moulded plastics element defining a single thickness with a slight curvature toward the tip. A button on one end of the finger projects into a hole in the tube to latch the finger in place.

In an alternative construction also previously used, which supersedes that shown in the above patent, there is provided a main longitudinal tube forming the base structure of the bat onto which is welded a plurality of sheet metal holders each for holding a finger of the construction shown in the patent.

These arrangements have some disadvantage in that the sheet metal elements are relatively expensive and in that they mount only a single thickness or strip of the finger so that there is a tendency of the finger to break at or adjacent the edge of the sheet metal element.

A less expensive construction comprises a coiled wire arrangement which defines two parallel spaced fingers connected by a central helical coil section which wraps around the tube. The central coil section is then bolted to the tube by a bolt which passes through diametrically opposed punched holes in the tube. The head of the bolt thus holds down the central section of the coil thus holding the coil in place and maintaining the fingers at a predetermined angular orientation around the axis of the tube.

This arrangement has some disadvantage in that, while it is cheap and easy to manufacture, the use of metal parts on the reel is disadvantageous in that any broken fingers or pieces of finger which enter the crop material pass into and through the combine harvester on which the header is mounted with significant danger of damage to the threshing system.

Another prior art construction manufactured by HCC Inc of Mendota Illinois comprises a moulded plastic finger which has integrally moulded with the finger portion a mounting portion in the form of a collar. The collar wraps wholly around the tube and is squeezed in place by a screw which clamps together two ends of the collar. In order to prevent rotation of the collar on the tube. there is provided a single moulded projection extending radially inwardly from an otherwise cylindrical surface of the collar so as to engage into a hole in the tube. This arrangement has the disadvantage in that it is relatively weak. It is desirable to provide a mounting which allows a user to attach either the wire coil arrangement or the plastic finger depending upon the requirements in particular crop conditions.

SUMMARY OF THE INVENTION

It is one object of the present invention to provide an improved arrangement for mounting a finger on the support tube of a bat of a harvesting header reel.

According to the invention there is provided a bat of a reel of a harvesting machine comprising:

a support tube for extending longitudinally of an axis of the bat;

a plurality of fingers mounted on the tube so as to extend generally outwardly from the tube in a radial plane of the axis;

the support tube having a plurality of finger support locations thereon arranged at spaced locations along the axis with each finger arranged at a respective one of the support locations along the length of the bat;

each finger including a finger portion and a mounting portion carried on the tube from which the finger portion extends;

each support location of the tube including two diametrically opposed indentations punched into a wall of the tube so that the indentations are recessed from an outside surface of the wall of the tube and with each indentation including a hole formed through the wall of the tube;

the mounting portion of each finger comprising a collar at least partly surrounding the tube at the support location, two projections on the collar extending radially inwardly from the collar and each engaging into a respective one of the indentations;

and a fastener extending through the holes in the tube and engaging the projections for pulling the projections radially inwardly to hold the projections in the respective indentations to hold the collar on the tube.

Preferably the collar extends only partly around the tube leaving an open portion and wherein the collar is formed from a material which is resiliently deformable allowing the open portion to be opened further by flexing of the collar to engage the collar and the projections around the tube.

Preferably the open portion comprises substantially the whole of the portion from one projection to the other projection.

Preferably each of the projections has a hole therethrough aligned with the respective hole in the tube and wherein the fastener passes through the hole in each of the projections.

Preferably the fastener is a bolt extending through the holes and carrying a nut to clamp the projections into the indentations.

Preferably the finger portion is attached to the collar at a position adjacent one of the projections and is spaced from the other of the projections to leave a portion of the collar adjacent the other of the projections which can flex.

Preferably the finger portion is shaped in cross-section adjacent the collar to form an edge flange lying in a plane parallel to the axis and a web at right angles to the edge flange.

Preferably the finger portion is attached to the collar at a position such that the edge flange is immediately adjacent one of the projections and the finger portion is spaced from the other of the projections to leave a portion of the collar adjacent the other of the projections which can flex.

Preferably the finger portion is shaped in cross-section adjacent the collar to form a second edge flange lying in a plane parallel to the axis and at right angles to the web.

Preferably the finger portion is attached to the collar at a position such that the edge flange is immediately adjacent one of the projections and the second edge flange is spaced from the other of the projections to leave a portion of the collar between the second edge flange and the other of the projections which can flex.

Preferably each of the projections is cylindrical about an axis longitudinal of the fastener.

According to a second aspect of the invention there is provided a finger per se as defined above which can be sold and used as a spare part for an existing bat.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
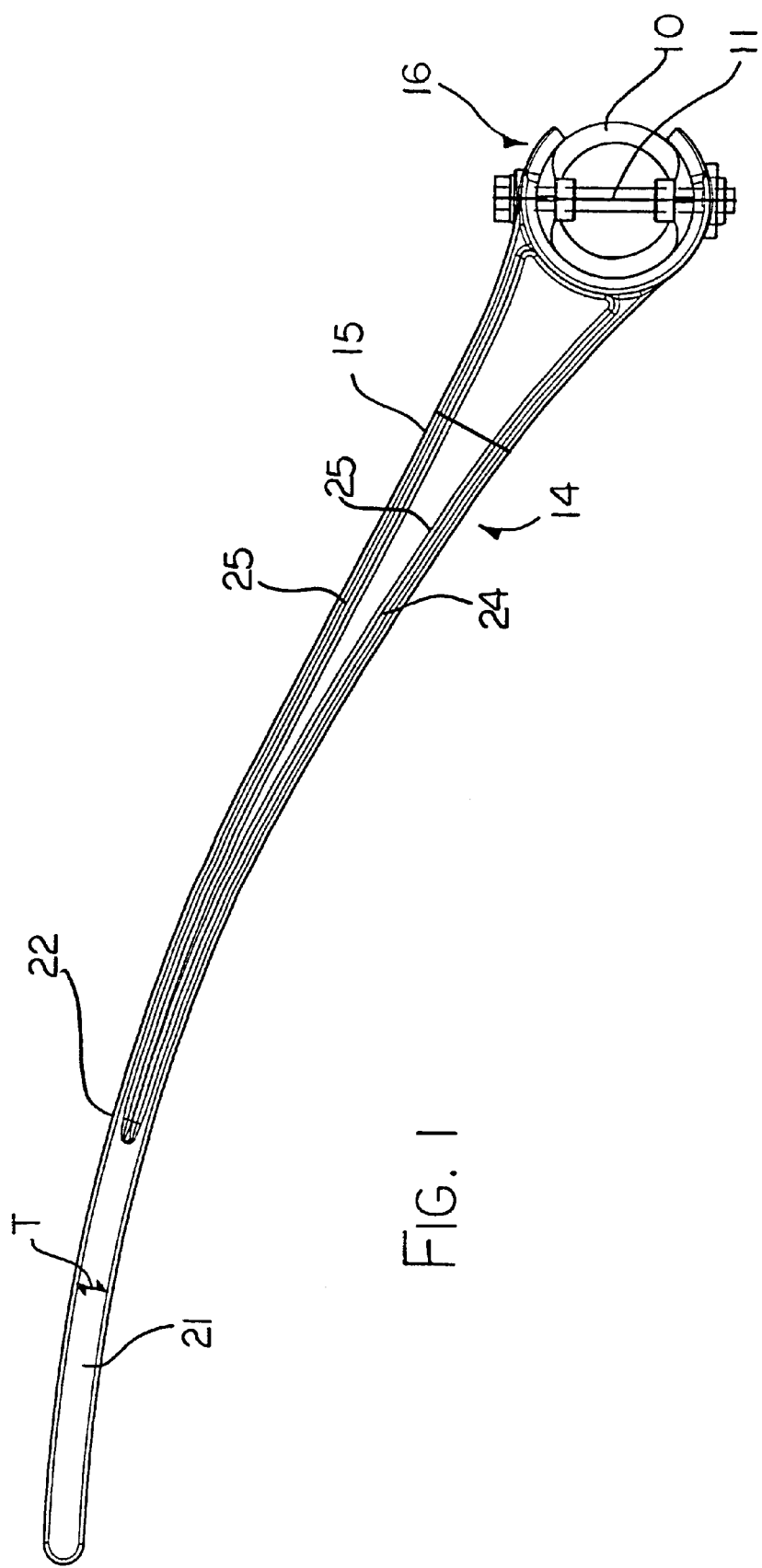
FIG. 1 is a side elevational view of one bat of a reel according to the present invention.
Figure 2:
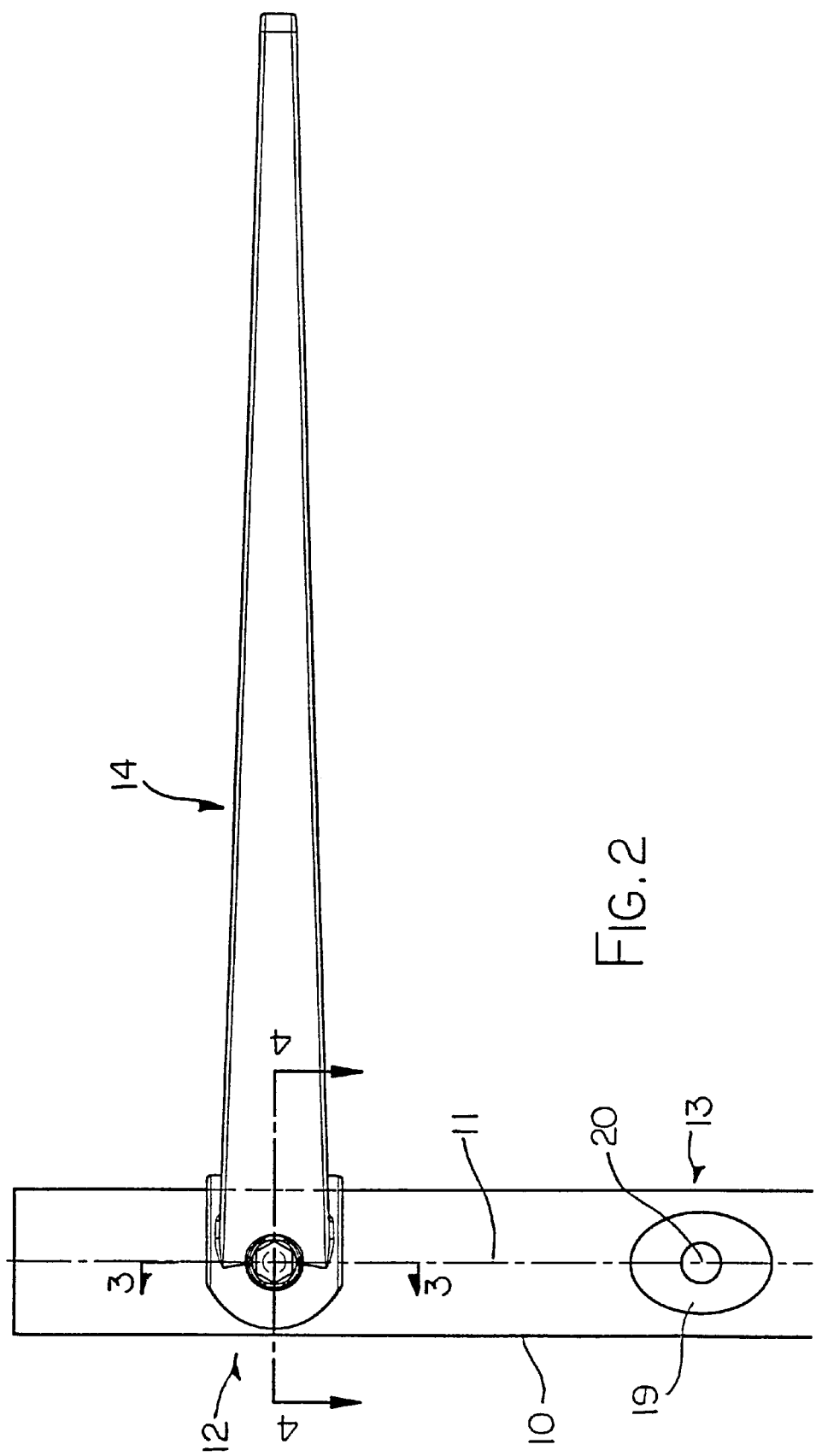
FIG. 2 is a top plan view of a part only of the bat of FIG. 1.
Figure 3:
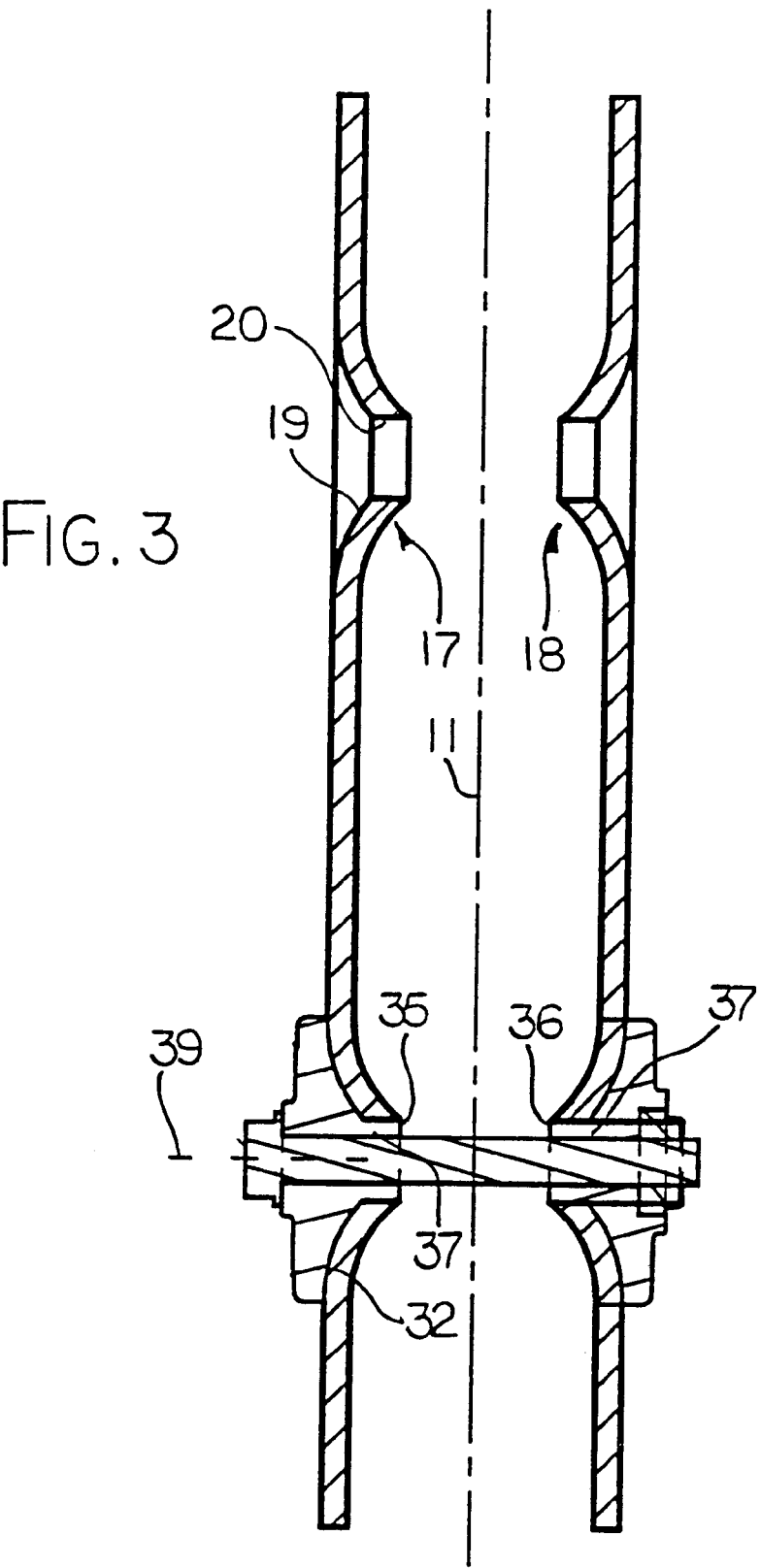
FIG. 3 is a cross-sectional view along the lines 3—3 of FIG. 2.
Figure 4:
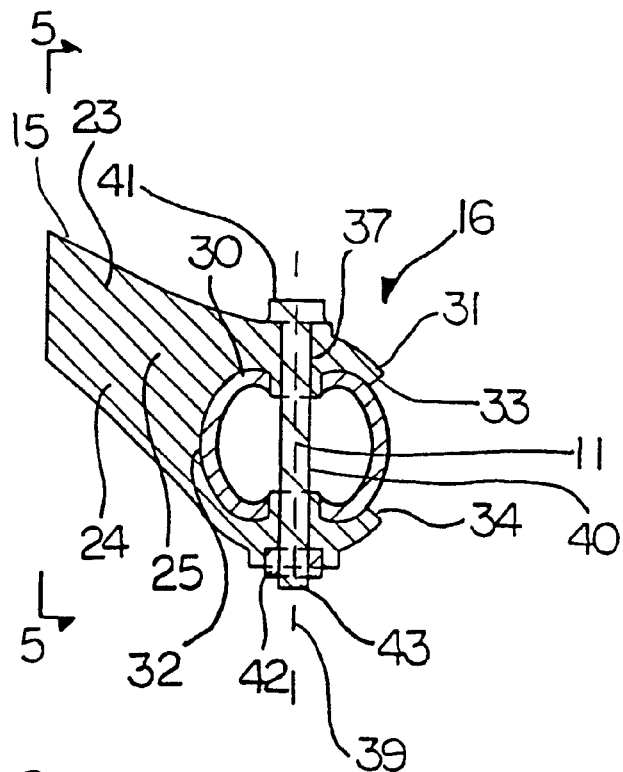
FIG. 4 is a cross-sectional view along the lines 4—4 of FIG. 2.

A bat for the reel of a harvesting machine comprises an elongate tube 10 having a longitudinal axis 11. In general, the tube is mounted so that its axis extends along the length of the bat with a plurality of bats arranged at angularly spaced positions around the axis of the reel. The tubes are mounted each for pivotal movement about the axis 11 as described in more detail in the above U.S. Pat. No. 4,776,155.

As these elements of the bat and the reel are well known from the prior art and can be varied in accordance with various design arrangements well known to one skilled in the art, no detailed description is provided in this application.

The tube 10 of the bat has a plurality of finger mounting locations 12, 13 etc. at each of which is mounted a respective one or plurality of bat fingers 14. Each finger comprises an elongate finger portion 15 and a mounting portion 16 which attaches the finger portion to the tube.

At each finger mounting location, the tube has two punched holes 17 and 18 at diametrically opposed positions in the wall of the cylindrical tube. Each hole is punched to form an indentation 19 in which the wall of the tube is indented inwardly toward the axis 11 and a hole 20 located at the innermost part of the indentation 19. Thus the punched holes 17 and 18 are aligned so a single fastener can pass through the holes.

The finger portion 15 includes an outermost part 21 which is tapered to a single thickness so its cross section is defined by a simple rectangular shape which reduces in width while the thickness T remains substantially constant.

Figure 5:
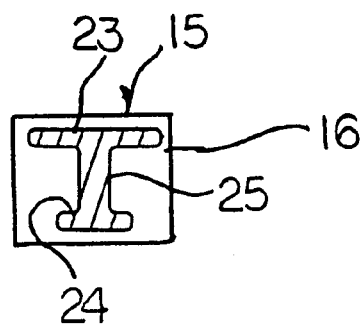
FIG. 5 is a cross-sectional view along the lines 5—5 of FIG. 4.

At a location indicated at 22, the cross sectional shape of the finger portion changes from the rectangular shape of the portion 21 to a shape which is substantially I-shaped. Thus the shape is shown in cross section in FIG. 5 including a top flange 23 and a bottom flange 24 together with a web 25 joining the flanges. The height of the web 25 as best shown in FIG. 1 increase from the apex at the point 22 down to the mounting member 16 to form a generally triangular shape. The I-shaped cross section of the finger towards its root at the mounting member significantly increases the strength and reduces the possibility of breakage through the thickness of the finger in the area of I-shaped cross section.

The mounting member 16 comprises a collar 30 which is generally of cylindrical shape with a cylindrical outer surface 31 and a generally cylindrical inner surface 32. The collar extends however only partly around the tube so that its inside surface 32 matches the outside surface of the tube. Thus the collar terminates at a first edge 33 and at a second edge 34. The collar extends through an angle more than 180° around the tube but less than 360° so that there is an open space between the edges 33 and 34. In practice the collar extends around approximately 240° leaving the open spaces as 12°.

The collar is moulded integrally with the root of the finger portion so that each of the flanges 23 and 24 converges smoothly into the outside surface of the collar. The web 25 is also attached to the collar and extends around the collar between the flanges 23 and 24. This mounting provides a structurally rigid connection between the finger and the collar which is resistant to breakage.

The collar has on its inside surface two projecting elements 35 and 36 which are arranged diametrically opposed. Each projecting element has a hole 37 passing through the projecting element and through the collar to be exposed on the outside surface 31. The projecting elements and the holes are diametrically opposed and radially inwardly extending relative to the collar so that each is coaxial about an axis 39 extending through the collar at right angles to the axis 11. Each of the projections has a second portion in which generally cylindrical in shape so as to fit into and through the hole 20 in the tube. Each of the projections has a frusto-conical base or first portion so as to fit into the indentation 19.

The open space between the edges 33 and 34 allows the collar to be flexed to an open position where it can pass over the outside of the tube. Thus the projections 35 and 36 are stretched outwardly by flexing of the collar to a position where they can pass over the diameter of the outside surface of the tube allowing them to slide to a position where they pop into the respective indentaion and hole. A bolt 40 is then passed through the aligned holes 37 so that a head 41 of the bolt engages the outer face 31 of the collar at one of the holes 37 and a nut 42 engages the outer face 31 at the other of the holes. The bolt is threaded at a threaded end 43 allowing the nut to be clamped tight squeezing the projections inwardly into the Indentations and holes in the tube. Thus the structure is relatively rigid and is held in place by two projections into the tube. The bolt preferably passes through both holes in the collar. However in an alternative arrangement (not shown) a self-tapping screw can be used which passes through the hole 37 of a first projection and taps a thread into the hole at the projection other side of the collar.

The flange 23 attaches to the collar 30 at a position immediately adjacent the projection 35 so that the flange 24 connects to the collar at a position spaced away from the projection 36. This leaves a flexible portion of the collar between the edge 34 and the flange 24 which can flex outwardly to allow the collar to be inserted in place onto the tube.

This construction allows easy installation of the finger while using the two existing holes that are required for the steel fingers The compression flange 23 is made wider than the tension flange to prevent buckling of the compression flange under load. causing the finger to twist and bend sideways, and making the finger ineffective at pulling crop into the header.

The design provides more uniform stresses in finger than prior art when loaded by crop.

The finger is longer than competition allowing it to flex over foreign objects and allowing it to work at a thicker mat of lodged crop before the finger tube compresses the crop.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A bat of a reel of a harvesting machine comprising:
   a support tube for extending longitudinally on an axis of the bat;
   a plurality of fingers mounted an the tube so as to extend generally outwardly from the tube in a radial plane of the axis;
   the support tube having a plurality of finger support locations thereon arranged at spaced locations along the axis with each finger arranged at a respective one of the support locations along the length of the bat;
   each finger including a finger portion and a mounting portion carried on the tube from which the finger portion extends;
   each finger including the finger portion and the mounting portion being molded integrally from a plastics material;
   each support location of the tube including two diametrically opposed indentations punched into a wall of the tube so that the indentations are recessed from an outside surface of the wall of the tube and with each indentation including a hole formed through the wall of the tube;
   the mounting portion of each finger comprising a collar at least partly surrounding the tube at the support location, two projections on the collar extending radially inwardly from the collar and each engaging into a respective one of the indentations;
   each projection comprising a first portion which projects into the respective indentation in the wall and a second portion which is cylindrical and projects through the respective hole in the wall;
   each of the projections having a hole through the first and second portions thereof so as to be aligned with the hole in the wall;
   and a fastener extending through the holes in the tube and through the holes in the projections so as to engage the collar at the projections for pulling the projections radially inwardly to hold the projections in the respective indentations to hold the collar on the tube.

2. The bat according to claim 1 wherein the collar extends only partly around the tube leaving an open portion and wherein the collar is molded from a plastics material which is resiliently deformable allowing the open portion to be opened further by flexing of the collar to engage the collar and the projections around the tube.

3. The bat according to claim 2 wherein the open portion extends substantially wholly from one projection to the other projection.

4. The bat according to claim 1 wherein the first portion of each of the projections comprises a frusto-conical portion converging radially inwardly relative to the collar from an outer end at the collar to an inner end.

5. The bat according to claim 1 wherein the fastener is a bolt extending through the holes and carrying a nut to clamp the projections into the indentations.

6. The bat according to claim 2 wherein the finger portion is attached to the collar at a position adjacent one of the projections and is spaced from the other of the projections to leave a portion of the collar adjacent the other of the projections which can flex.

7. The bat according to claim 1 wherein the finger portion is shaped in cross-section adjacent the collar to form an edge flange lying in a plane parallel to the axis and a web at right angles to the edge flange.

8. The bat according to claim 7 wherein the finger portion is attached to the collar at a position such that the edge flange is immediately adjacent one of the projections and the finger portion is spaced from the other of the projections to leave a portion of the collar adjacent the other of the projections which can flex.

9. The bat according to claim 7 wherein the finger portion is shaped in cross-section adjacent the collar to form a second edge flange lying in a plane parallel to the axis and at right angles to the web.

10. A bat of a reel of a harvesting machine comprising;
    a support tube for extending longitudinally on an axis of the bat;
    a plurality of fingers mounted on the tube so as to extend generally outwardly from the tube in a radial plane of the axis;
    the support tube having a plurality of finger support locations thereon arranged at spaced locations along the axis with each finger arranged at a respective one of the support locations along the length of the bat;
    each finger including a finger portion and a mounting portion carried on the tube from which the finger portion extends;
    each finger inducing the finger portion and the mounting portion being molded integrally from a flexible plastics material;
    each support location of the tube inducing two diametrically opposed indentations punched into a wall of the tube so that the indentations are recessed from an outside surface of the wall of the tube and with each indentation including a hole formed through the wall of the tube;
    the mounting portion of each finger comprising a collar at least partly surrounding the tube at the support location, two projections on the collar extending radially inwardly from the collar and each engaging into a respective one of the indentations;
    and a fastener extending through the holes in the tube and engaging the projections for pulling the sections radially inwardly to hold the projections in the respective indentations to hold the collar on the tube;
    wherein the finger portion is attached to the collar at a position such that the finger portion is immediately adjacent one of the projections and the finger portion is spaced from the other of the projections to leave a portion of the collar between the finder portion and the other of the projections which can flex.

11. A finger for a bat of a reel of a harvesting machine comprising:

a finger portion and a mounting portion from which the finger portion extends;

the finger portion and the mounting portion being molded integrally from a flexible plastics material;

the mounting portion of each finger comprising an annular collar for at least partly surrounding a tube of the bat;

the finger portion lying in a common plane with the collar such that in use the finger portion lies in a radial plane of the tube;

the collar having two diametrically opposed projections on the collar extending radially inwardly from the collar for engaging into a respective one of two the indentations on the tube;

each projection comprising a first frusto-conical portion extending radially inwardly relative to the collar from an outer end at the collar to an inner end and a second portion extending radially inwardly from the inner end of the first portion, the second portion being cylindrical with a cylinder axis extending radially inwardly relative to the collar;

at least one of the projections having a hole therethrough extending radially inwardly relative to the collar and extending through the first and second portions thereof for receiving a fastener extending therethrough.

12. The finger according to claim 11 wherein the collar is arranged to extend only partly around the tube leaving an open portion and wherein the collar is molded from a plastics material which is resiliently deformable allowing the open portion to be opened further by flexing of the collar for engaging the collar and the projections around the tube.

13. The finger according to claim 12 wherein the open portion extends substantially wholly from one projection to the other projection.

14. The finger according to claim 12 wherein each of the projections has a hole therethrough.

15. The finger according to claim 11 wherein the finger portion is attached to the collar at a position adjacent one of the projections and is spaced from the other of the projections to leave a portion of the collar adjacent the other of the projections which can flex.

16. The finger according to claim 11 wherein the finger portion is shaped in cross-section adjacent the collar to form an edge flange lying in a plane parallel to the axis and a web at right angles to the edge flange.

17. The finger according to claim 16 wherein the finger portion is attached to the collar at a position such that the edge flange is immediately adjacent one of the projections and the finger portion is spaced from the other of the projections to leave a portion of the collar adjacent the other of the projections which can flex.

18. The finger according to claim 16 wherein the finger portion is shaped in cross-section adjacent the collar to form a second edge flange lying in a plane parallel to the axis and at right angles to the web.

19. A finger for a bat of a reel of a harvesting machine comprising:

a finger portion and a mounting portion from which the finger portion extends;

the finger portion and the mounting portion being molded integrally from a flexible plastics material;

the mounting portion of each finger comprising an annular collar for at least partly surrounding a tube of the bat;

the finger portion lying in a common plane with the collar such that in use the finger portion lies in a radial plane of the tube;

the collar having two diametrically opposed projections on the collar extending radially inwardly from the collar for engaging into a respective one of two the indentations on the tube;

at least one of the projections having a hole therethrough extending radially inwardly relative to the collar and extending through the first and second portions thereof for receiving a fastener extending therethrough;

wherein the finger portion is attached to the collar at a position such that the finger portion is immediately adjacent one of the projections and the finger portion is spaced from the other of the projections to leave a portion of the collar between the finger portion and the other of the projections which can flex.

* * * * *